L. E. WATERMAN.
MECHANISM FOR TRACTOR PLOW LIFTS.
APPLICATION FILED MAY 25, 1914.
1,198,297.
Patented Sept. 12, 1916.
3 SHEETS—SHEET 3.
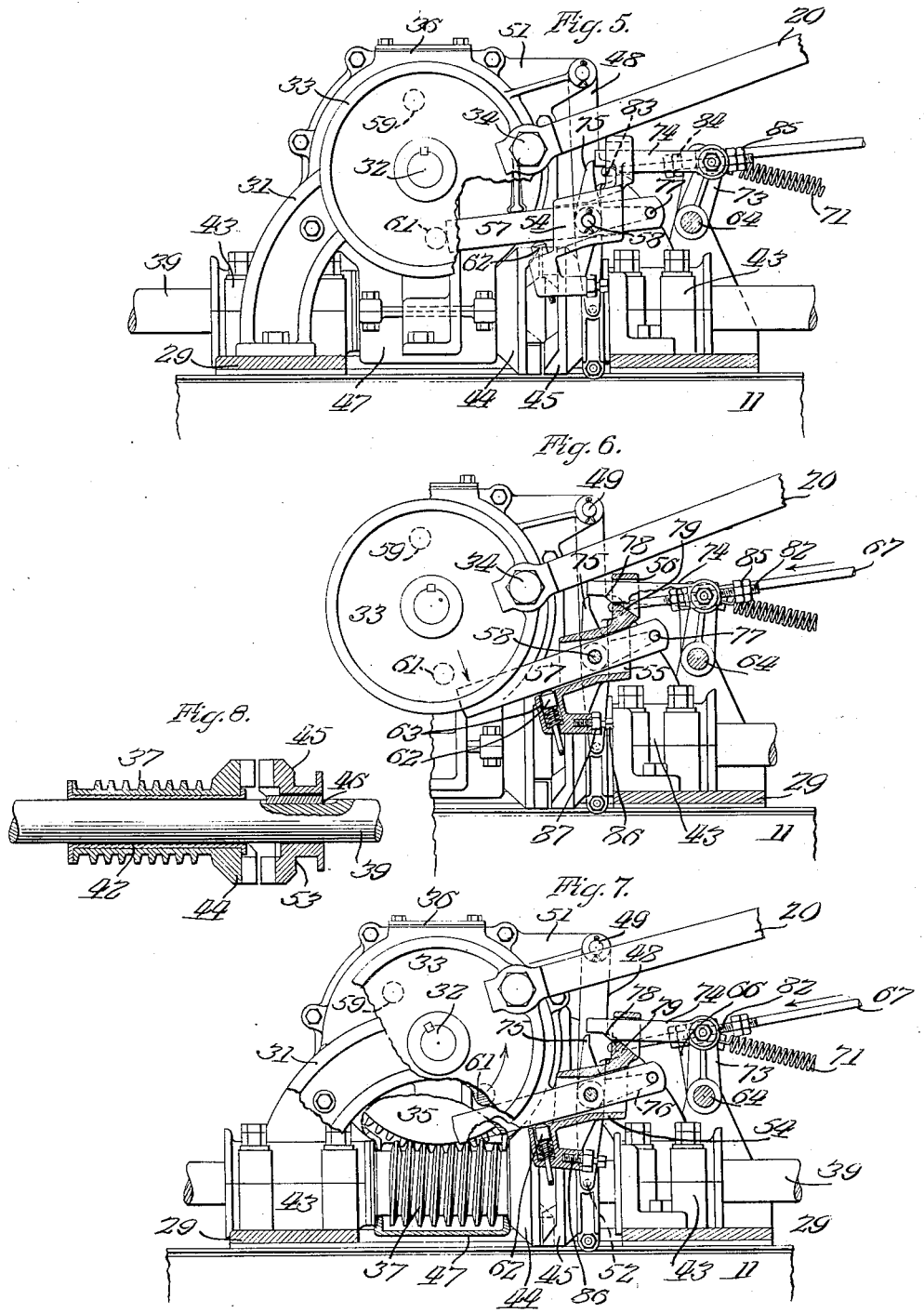

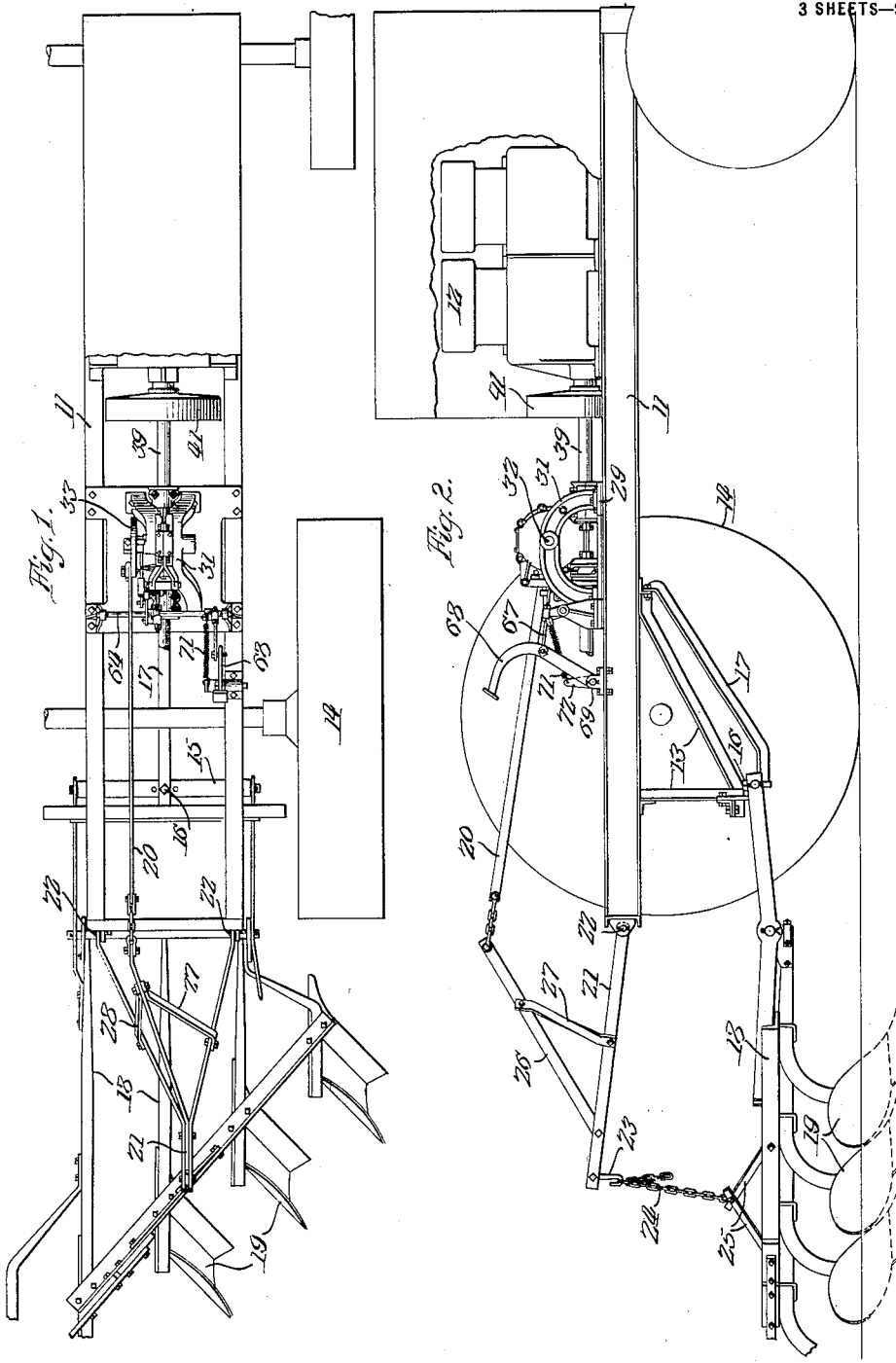

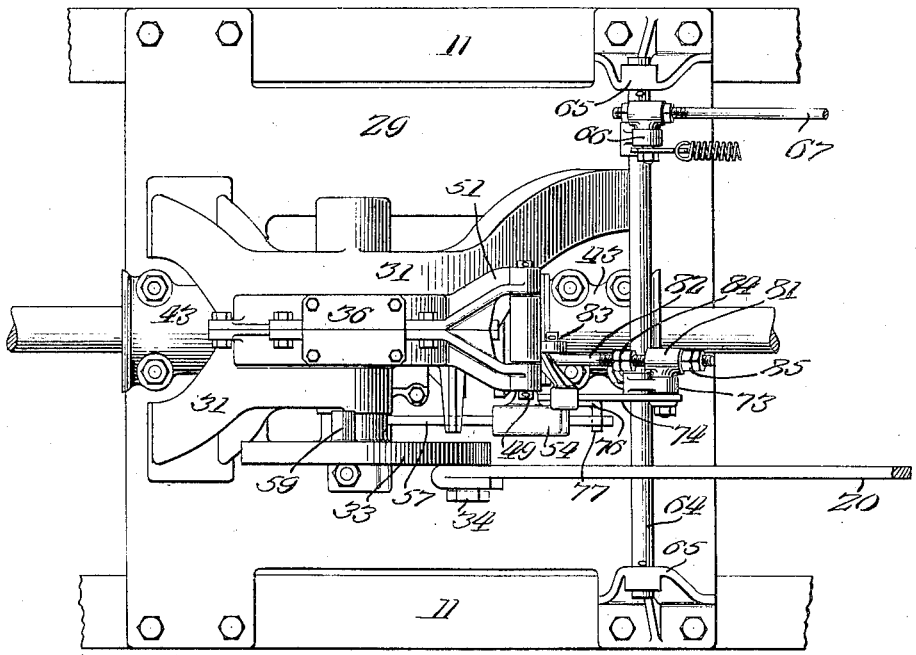
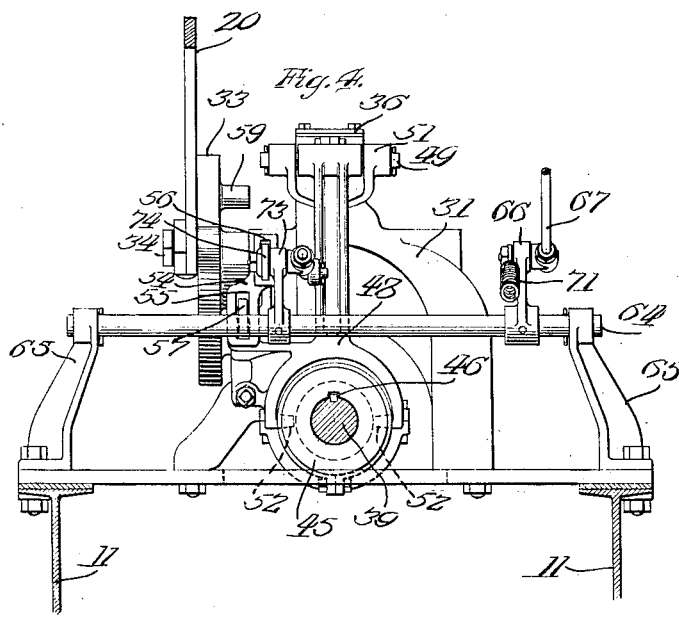

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

MECHANISM FOR TRACTOR-PLOW LIFTS.

1,198,297.          Specification of Letters Patent.     Patented Sept. 12, 1916.

Application filed May 25, 1914. Serial No. 840,879.

*To all whom it may concern:*

Be it known that I, LEWIS E. WATERMAN, a citizen of the United States, residing at Rockford, in the county of Winnebago and State of Illinois, have invented certain new and useful Improvements in Mechanism for Tractor-Plow Lifts, of which the following is a specification.

This invention relates to the general art of tractor plows and pertains more particularly to power operated mechanism for raising and lowering a gang of plows pivotally connected with a tractor frame.

Steam traction engines and gasolene tractors are now quite generally used in tilling the soil and harvesting the crops, and while it has heretofore been the general custom to hitch the plows behind the engine or tractor, the plows being carried on independent wheel supported frames, it is now becoming the practice to hitch the plows to and support them directly from the tractor or engine frame, so that the plows are brought closer to the source of power and, consequently, may be pulled easier.

My present invention aims to provide a thoroughly practical and efficient mechanism for raising and lowering a gang of plows so connected with the tractor.

In carrying out this general idea one of the primary objects of my invention is to provide a plow lift which can be operated by the power from the engine to lift the plows out of the ground and which will automatically stop the lifting operation when the plows have reached the limit of their upward travel and which will also retain the plows in their elevated or inoperative position.

Another object is to provide means which will insure the lowering of the plows to the same predetermined depth at each lowering operation, thereby precluding any possibility of the plows cutting deeper or shallower than desired.

A further object is to provide means whereby the raising and lowering mechanism may be readily manipulated and controlled by the operator and which, after once having been set in motion, will require no further attention but will automatically throw out of operation when the plows have reached the predetermined desired position.

For the purpose of facilitating the explanation of my invention I have illustrated on the accompanying drawings one preferred embodiment thereof, but it will be readily appreciated as my invention is better understood, that it is not limited to plow lifts but is capable of application to cultivators and other farming implements, the word "plow", as hereinafter used, being illustrative merely of a general class of farming implements.

Referring to the drawings—Figure 1 is a fragmentary plan view of a tractor plow embodying my invention; Fig. 2 is a side elevation thereof; Fig. 3 is an enlarged fragmentary plan view of the lift controlling mechanism; Fig. 4 is an elevational view, looking toward the left, of the structure shown in Fig. 3; Fig. 5 is a side elevation of the construction shown in Fig. 3, certain parts being shown in section; Fig. 6 is a similar view showing the position of the parts just prior to a lifting or lowering movement; Fig. 7 is a similar view showing the position of the parts just after the lifting or lowering has been started, and Fig. 8 is a detail view of the driving worm and clutch.

On the drawings reference character 11 designates the main frame of a tractor upon which is mounted the engine, designated generally by reference character 12. A bracket 13 is mounted on the underside of the frame 11, preferably between the tractor wheels 14, and a cross bar 15, carried by said bracket, is attached intermediate its ends by a bolt 16 or otherwise to a brace or drawbar 17 secured at its forward end to the frame 11. The plow frame 18, equipped with the plows 19 or other earth agitating devices, is pivotally connected at its forward end to the cross-bar 15 as shown in Figs. 1 and 2, so that said frame may be swung vertically about its pivot to raise or lower the plows. Since the particular construction of the plow frame and beams is not material to the present invention a detailed explanation of the frame and beams, shown for purposes of illustration, will not be entered into.

Upon the rear end of the tractor frame 11, above the plow frame, I have pivotally mounted an arm 21 which, as will be evident from inspection of Fig. 1, is preferably bifurcated, the inner ends of the separated portions of the arm being pivotally connected to the tractor frame 11 by bolts or pins 22. The rear end of arm 21 is equipped with a hook 23 from which a chain 24 is suspended, the lower end of the chain being attached to a pair of links 25 secured to the plow frame. For the purpose of securing the required leverage to lift the arm 21 and the plow frame suspended therefrom I have equipped the arm with an upwardly extending lever 26 which is held in the position shown in Figs. 1 and 2 by straps or braces 27 and 28 respectively. It will be evident that a forward pull exerted upon the upper end of lever 26 will swing the arm 21 upwardly about its pivot, thereby lifting the plow frame about its pivotal connection with the cross bar 15. The arm 21 and the plow frame carried thereby are raised and lowered through the intermediary of a link 20 attached at its rear end to the upper end of lever 26 and at its forward end to operating mechanism which will now be described.

Referring now more particularly to Figs. 2, 3 and 4, it will be observed that upon the frame 11 of the tractor, rearwardly of the engine 12, there is mounted a bed 29 rigidly bolted to the tractor frame and carrying an arched standard 31 in which is journaled a crank shaft 32 equipped at one end with a crank in the form of a disk 33 keyed to the shaft and provided with a wrist pin 34 to which the forward end of link 20 is connected. It will be manifest that upon rotation of the crank shaft the link 20 will be pulled forwardly as the wrist pin 34 moves from its rearward to its forward position, with the result that the plow frame will be elevated and that upon movement of the wrist pin from its forward position to its rearmost position the plow frame will be lowered again.

The mechanism for driving the crank shaft comprises a worm gear wheel 35 fixed on the shaft 32 intermediate its ends, said wheel being covered by a casing 36 formed upon the opposed portions of the arched standard 31, as best shown in Fig. 3. A worm 37 is sleeved, as shown in Fig. 8, upon the main shaft 39 of the engine, which shaft is extended rearwardly beyond the fly wheel 41, as shown in Figs. 1 and 2. A bushing 42 of any suitable character is preferably interposed between the worm and its shaft. The shaft, which is continuously rotated by the engine, is journaled in suitable bearings or boxes 43 mounted on the bed 29, and motion is transmitted from said shaft to the worm through the instrumentality of a clutch comprising a member 44 formed integrally with the worm sleeve and a movable member 45 adapted to engage with the member 44, said movable member being slidably secured on the shaft 39 by a spline 46. Longitudinal movement of the worm on the drive shaft is prevented by a casing 47 shaped to engage with the flanges at each end of the worm, and the pitch of the worm is such that rotation of the crank shaft is prevented when the clutch is thrown out by coöperation of the worm with the worm-wheel 35.

The clutch, which is normally retained in inoperative position, is thrown in by the operator to actuate the crank shaft and is automatically thrown out when the plow frame has been lifted or lowered to a predetermined position by means of clutch controlling mechanism, including a yoke 48 pivotally suspended from a pin 49 disposed in suitable ears or lugs 51 projecting rearwardly from the upper portion of the arched standard. The lower end of the yoke is bifurcated and provided with opposed fingers or studs 52, which engage in an annular groove 53 formed in the sleeve of the movable clutch member 45. Upon swinging movement of the yoke about its pivot pin 49 the clutch member will be moved longitudinally of the drive shaft into or out of engagement with the opposed clutch member 44. Upon one side of the yoke 48 I have formed a lateral extension 54, of suitable shape, to provide a housing having a pair of longitudinally disposed sockets or apertures 55 and 56 respectively. An elongated bar or abutment 57 is pivoted in the socket 55 upon a pivot pin 58, the socket being of suitable shape to permit limited rocking movement of the abutment about its pivot. The inner face of the crank disk 33 is equipped with a pair of stops in the form of studs or pins 59 and 61 respectively, and the forward end of the abutment 57 is normally held in the path of movement of said pins, as shown in Fig. 5, by means of a spring-pressed plunger 62 disposed in a suitable socket 63 formed in the yoke extension 54. When upon rotation of the crank shaft 32 one of the pins is brought into engagement with the abutment 57 the yoke will be swung rearwardly to disengage the clutch member 45 from its companion member 44, thereby stopping the rotation of the crank shaft. The pins 59 and 61 are so positioned with respect to the wrist pin 34 that the shaft will be stopped with the wrist pin either in its extreme forward or extreme rearward position, with the result that vertical movement of the plow frame will be discontinued when the frame has reached the upper limit of its travel, or, assuming that the plows are in operative position, as shown in Fig. 2, it will be manifest that when the clutch is thrown in the crank shaft will be rotated one-half revolution to lift the plow frame to the limit of its upward travel whereupon the clutch will be automatically thrown out and the plows will be retained in their raised position, and that when the clutch is next thrown in the crank shaft will receive a semi-revolution to lower the plows into operative position, whereupon the clutch will again be automatically thrown out.

For the purpose of moving the abutment 57 out of the path of travel of the stop pins 59 and 61 and for the further purpose of subsequently throwing the clutch in I have provided the following mechanism: A rock shaft 64 mounted in suitable bearings 65 mounted on the bed 29 is provided with an upstanding arm 66 to which the forward end of an operating rod 67 is attached, the rear end of this rod being connected with a foot pedal 68 (Fig. 2) pivoted at 69 on the tractor frame. The shaft is normally retained in the position shown in Figs. 2 and 5 by means of a coiled contraction spring 71 attached at one end to the arm 66 and at its other end to a fixed finger 72, so that the foot pedal is normally disposed in its rearmost position. The rock shaft has also fixedly secured thereto in alinement with the socket 56 another upstanding arm 73 to which a finger 74, projecting through the socket 56, is attached. A bell crank member comprising an upwardly extending arm or finger 75 and a rearwardly extending arm 76, provided with a laterally projecting finger 77 engaged in an aperture in the forwardly projecting end of abutment 57, is pivoted on the abutment pivot 58 to rock in unison with the abutment.

From Fig. 5 it will be apparent that the upper end of finger 75 is disposed in alinement with and in proximity to the end of the member 74 when the clutch is in inoperative position. Initial operative movement of the rock shaft 64 in a counter-clockwise direction, viewing Fig. 5, will cause the member 74 to rock the bell crank lever on its pivot thereby rocking the abutment 57 about its pivot out of the path of movement of the pin 61 into the position shown in Fig. 6. When this movement has been effected the member 74 will be disengaged from the finger 75 by reason of an inclined surface 78 formed on the lower edge of member 74 which rides up an opposed inclined surface 79 formed in the bottom of the socket 56. This movement of the abutment to inoperative position takes place just as the initial movement is being imparted to the clutch member 45.

From Figs. 3, 5, 6 and 7 it will be observed that the arm 73 is provided with a laterally cored boss 81 through which a link 82, connected at 83 to the yoke 48, projects. The link 82 is provided with pairs of stop nuts 84 and 85 respectively, which are spaced apart thereon, as shown in Fig. 3, to provide a lost motion connection between the arm 73 and the link. When the arm has been moved from the position shown in Fig. 5 to that shown in Fig. 6 to rock the abutment 57 into inoperative position the boss 81 will have been brought into engagement with the stop nut 84 and further movement of the arm 73 will, through the link 82, rock the yoke 48 to throw in the clutch member 45, the position of the various parts when this result has been accomplished being illustrated in Fig. 7. As soon as the clutch is thrown in the crank shaft will be rotated by the worm 37 and pin 61 will travel over the depressed abutment. As soon as the pin has moved away from the abutment the plunger 62 will return the abutment to its operative position in the path of pin 59 and when, after a half revolution of the crank shaft has taken place, the pin 59 engages the end of the abutment the yoke 48 will be swung forwardly by the abutment to release the clutch member 45. When this release is effected the wrist pin 34 will have traveled through an angle of 180 degrees to lift the plows, through the instrumentality of the lifting arm and link connections, into their elevated inoperative position.

It will be understood from the foregoing that when it is desirable to lift the plows the operator presses the pedal 68 forwardly with his foot which through the rod 67 rocks the shaft 64. Initial rocking movement of the shaft depresses the throw-out abutment to inoperative position and subsequent movement throws in the clutch. As soon as the foot is moved from the pedal the rock shaft is returned to normal position by the spring 71. After the revolution of the rock shaft has been started the throw-out abutment is returned to operative position in the path of the stop pin and after a half revolution of the shaft has been effected the pin, acting on the abutment, automatically throws out the clutch. In order to limit the throw-out movement of the clutch I prefer to provide the yoke with an adjustable abutment in the form of a screw 86 threaded into the lower portion of the lateral yoke extension 54 and retained in adjusted position by a lock nut 87. This abutment screw is positioned to engage with the rear face of the main shaft journal 43 when the clutch is thrown out to thereby limit the throw-out movement.

The invention disclosed, after being thrown into operation, acts automatically to lift the plows or lower them as the case may be, and after the lifting or lowering movement has been completed the mechanism is automatically thrown out of operation, so that the plows are always left in either their extreme elevated or extreme lowered position. All danger of leaving the plows in a partially raised position is thereby eliminated.

That embodiment of my invention which I have shown and described is, it should be understood, illustrative merely of the general principles of the invention and I do not, therefore, desire to be restricted to the mechanical details disclosed but believe that my invention should be circumscribed only by the scope of the appended claims and that all modifications which fall within the terms of these claims should be considered as a part of this invention.

I claim:

1. In a device of the character described, the combination of a crank shaft, a drive shaft, driving connections including a clutch between said drive shaft and said crank shaft, a pin carried by the crank shaft, a yoke connected with the movable member of said clutch, and an abutment pivotally mounted on said yoke, and means for normally positioning said abutment in the path of movement of said pin whereby said pin, acting through said abutment, will move said yoke to disengage said clutch when the crank shaft has been moved to a predetermined position.

2. In a device of the character described, the combination of a crank shaft, means including a clutch for driving said crank shaft, a pivotally mounted yoke connected with one member of said clutch, an abutment pivoted on said yoke, a pin carried by the crank shaft, and means for normally positioning said abutment in the path of said pin whereby said clutch is disengaged upon movement of the crank shaft to a predetermined position.

3. In a device of the character described, the combination of a crank shaft, means including a clutch for driving said crank shaft, a pin carried by the crank shaft, a movable abutment connected so as to move bodily with one member of said clutch, means for normally positioning said abutment in the path of movement of said pin, and means for moving said abutment into inoperative position and subsequently throwing in said clutch.

4. In a device of the character described, the combination of a crank shaft, driving means for said crank shaft including a clutch, an abutment connected to one member of said clutch and movable bodily therewith, means for yieldingly holding said abutment in operative position, means movable with the shaft to engage said abutment and thereby move the same and the clutch member connected therewith to throw out the clutch, and foot controlled means for moving said abutment into inoperative position and subsequently throwing in said clutch.

5. In a device of the character described, the combination of a crank shaft, means including a clutch for driving said crank shaft, means including a pin carried by the crank shaft and an abutment movable with one member of said clutch for throwing out said clutch when the pin is brought into engagement with said abutment, means for moving said abutment relatively to the clutch to inoperative position and subsequently moving said abutment and said clutch member together to throw in said clutch, and means for automatically returning said abutment to operative position.

6. In a device of the character described, the combination of a crank shaft, driving means for said crank shaft including a clutch, a yoke connected with one member of said clutch, an abutment pivoted on said yoke, means adapted to engage said abutment and swing the yoke to release said clutch when the shaft reaches a predetermined position, adjustable means for limiting the throw-out movement of said clutch, a rock shaft, means actuated by said rock shaft for moving said abutment into inoperative position, connections between said rock shaft and said yoke for moving said clutch member into operative position, and means for operating said rock shaft.

7. In a device of the character described, the combination of a crank shaft, driving means for said crank shaft including a clutch, a yoke connected with one member of said clutch, a rock shaft connected with said yoke, means for automatically throwing out said clutch when the crank shaft has been moved to a predetermined position, and means for operating said rock shaft to throw in said clutch.

8. In a device of the character described, the combination of a crank shaft, means for rotating said crank shaft including a clutch having a movable member, a yoke pivoted at one end and connected at its other end to said movable clutch member, an abutment pivoted on said yoke, a plurality of stops carried by the crank shaft, means for yieldingly holding said abutment in the path of travel of said stops so that when one of said stops engages with said abutment the yoke will be swung on its pivot to position the movable member of the clutch in inoperative position, adjustable means for limiting the throw-out movement of said clutch member, a rock shaft, foot controlled means for moving said shaft, means actuated by the shaft for moving said abutment out of the path of said stops, and connections between said rock shaft and said yoke whereby continued movement of said rock shaft will move said clutch member into operative position.

9. In a device of the character described, the combination of a drive shaft, a driven shaft, driving connections including a worm, a worm wheel and a clutch between said shafts, a yoke connected with one member of said clutch to operate the same, an abutment pivotally mounted on said yoke, a stop fixed with respect to the driven shaft, means for normally positioning said abutment in the path of movement of said stop, and means adapted upon initial movement thereof to swing said abutment on its pivot out of the path of said stop and then to operate said yoke to move the clutch member into operative relation with the other clutch member.

10. In a device of the character described, the combination of a driven member, means including a clutch for driving the same, a stop fixed with respect to the driven member, a yoke connected to one member of the clutch, an abutment pivotally mounted on said yoke and movable bodily therewith, and means for first swinging said abutment on its pivot and then moving the yoke and the abutment carried thereby to throw in said clutch.

LEWIS E. WATERMAN.

Witnesses:
W. R. BAXTER,
J. A. GARVER.